United States Patent [19]
Oksanen et al.

[11] Patent Number: 4,936,541
[45] Date of Patent: Jun. 26, 1990

[54] PROPORTIONAL FLUID VALVE APPARATUS

[75] Inventors: Kari J. Oksanen, Vancouver; Eugene P. Kalaman, Langley, both of Canada

[73] Assignee: Singer Valve (1985) Inc., Surrey, Canada

[21] Appl. No.: 354,362

[22] Filed: May 19, 1989

[51] Int. Cl.$^5$ ............... F16K 31/385; F16K 31/40
[52] U.S. Cl. ....................... 251/30.04; 251/30.05; 251/38
[58] Field of Search .................. 137/625.61, 625.64; 251/30.03, 30.04, 30.05, 38

[56] References Cited
U.S. PATENT DOCUMENTS

| | | |
|---|---|---|
| 1,077,503 | 11/1913 | Anderson . |
| 2,020,833 | 11/1935 | Hansen . |
| 3,307,823 | 3/1967 | Greer . |
| 3,994,318 | 11/1976 | Ishigaki . |
| 4,044,787 | 8/1977 | Sutherland ................. 251/61.4 X |
| 4,266,572 | 5/1981 | Schuttenberg et al. ... 137/625.64 X |
| 4,268,006 | 5/1981 | Kunz et al. ............... 251/30.03 X |
| 4,295,631 | 10/1981 | Allen . |
| 4,477,051 | 10/1984 | Ben-Yehuda . |
| 4,553,732 | 11/1985 | Brundage et al. . |
| 4,793,589 | 12/1988 | Eldredge et al. ............... 251/30.03 |
| 4,823,750 | 4/1989 | Niida et al. ............... 251/30.03 X |

FOREIGN PATENT DOCUMENTS

| | | |
|---|---|---|
| 807348 | 6/1951 | Fed. Rep. of Germany . |
| 910858 | 6/1954 | Fed. Rep. of Germany . |
| 1094061 | 12/1960 | Fed. Rep. of Germany ........ 251/38 |
| 1924750 | 11/1969 | Fed. Rep. of Germany ........ 251/38 |
| 1021143 | 2/1953 | France . |

Primary Examiner—Gerald A. Michalsky
Attorney, Agent, or Firm—Shlesinger & Myers

[57] ABSTRACT

A valve apparatus has a valve body with an inlet, an outlet and a main valve seat disposed therebetween. A complementary main valve member can be moved by an actuating piston/diaphragm between open and closed positions, or located at an intermediate position therebetween. The actuating piston/diaphragm has one side exposed to an actuating chamber which receives fluid from the inlet through a metering orifice on one side, and an opposite side exposed to outlet pressure. A servo valve assembly controls flow from, and pressure within, the actuating chamber and controls movement of the main valve member. The servo valve assembly can be positioned by a relatively low force actuator in any position between extremes thereof, and acts as a master for the main valve member which follows it as a slave between open and closed positions, and any intermediate positions therebetween. The actuator is protected from high fluid forces imposed on the main valve member.

11 Claims, 3 Drawing Sheets

PROPORTIONAL FLUID VALVE APPARATUS

BACKGROUND OF THE INVENTION

The invention relates to a valve apparatus for controlling flow through a conduit, such as municipal water supply conduits of any size, the valve being positionable to attain any Position between open and closed positions thereof.

Large fluid control valves, as used in municipal water supplies, have been known for many years and to the inventor's knowledge are of two main general types. The first type has a moveable valve member which is complementary to a valve seat and can be positioned at any position between fully opened and fully closed, and requires a heavy duty actuator to move the valve member against fluid forces, at least in one direction. A valve of this type can use a screw-threaded actuator, which can be either manually-actuated directly, or it can be actuated from a remote location if necessary through a power source. With large diameter water conduits, the force involved in moving the valve member can be considerable, requiring heavy duty actuators.

The second type of valve utilizes fluid pressure to assist in moving the valve member between open and closed positions. A valve of this type is disclosed in U.S. Pat. No. 4,295,631 (Allen) which discloses a main valve controlled by a solenoid actuated servo valve having a fixed axially extending servo valve outlet tube extending through a central opening in a diaphragm valve member. An open end of the tube is fixed and serves as a servo valve seat. The main valve is closed by a spring and fluid pressure on one side of the diaphragm is referenced with the outlet pressure and is used to assist in opening the valve against the spring. A short stroke solenoid provides simple, low power operation of the valve between either fully opened or fully closed positions, and the reference does not disclose means to position the diaphragm in any intermediate Position.

U.S. Pat. No. 4,553,732 (Brundage et al) discloses a servo operated flow regulating valve which can be remotely controlled by varying energization of a solenoid. The valve has a normally-closed, spring-biased, pressure differential-actuated main valve element, and a pressure-compensated, servo flow valve using a solenoid. The solenoid controls a variable flow of fluid through the servo valve which controls pressure difference across the main valve element. This valve requires a spring to apply a closing force in one direction, which is overcome by fluid forces in an opposite direction, and would be appropriate for hydraulic flow valves of relatively high pressures (e.g. up to 6,000 pounds square inch) and presumably of relatively small diameter when compared with municipal water valves.

U.S. Pat. No. 4,477,051 (Ben-Yehuda) discloses a flow control valve having a closure element responsive to differential pressure between pressure in a valve cavity and main fluid Pressure on an opposite side of a diaphragm separating the cavity from the main fluid. A fixed metering orifice controls Pressure in the cavity and the valve may be closed manually by turning a threaded handle. This method of closure contrasts with the two earlier patents discussed above, both of which disclose a spring-closed valve member. Use of a main valve spring to position the valve member in either closed or open positions requires use of a high force actuator to overcome force from the valve spring, which can present problems when operating valves remotely. None of the devices disclosed in above patents would be appropriate for large valves that are used for controlling large fluid flows such as found in municipal water supplies.

To the inventor's knowledge, there are no valves which use pressure differential across the valve to apply power for shifting the valve to attain intermediate positions between the open and closed positions.

SUMMARY OF THE INVENTION

The invention reduces the difficulties and disadvantages of the prior art by providing a proportional valve which can be used to control fluid flow in conduits of essentially any size. The valve uses pressure differentials across the valve to Provide force for varying space between valve Portions and can be positioned at any position between fully opened and fully closed by a relatively low force actuator or controller. The pressure differentials can be used to open and close the present valve, which does not require a main valve spring to position the valve member in either a normally-open, or normally-closed position. Furthermore, the invention utilizes the low force actuator to control a servo valve which is protected from heavy forces imPosed on the main valve member by fluid flow. The invention is mechanically quite simple and can be used as a "retrofit change" to an existing valve apparatus for minimal installation costs.

A valve apparatus according to the invention has a valve body having a main valve inlet, a main valve outlet and a first main valve portion disposed therebetween. A second main valve portion is complementary to the first main valve portion and is moveable between open and closed positions thereof so as to seal against the first main valve portion. The apparatus includes a main valve actuating means for moving the second main valve portion between the open and closed positions thereof. The actuating means has an actuating chamber and a partition means moveable within the actuating chamber, the partition means cooperating with the second valve portion to move therewith. The partition means has one side exposed to Pressure in the actuating chamber, and an opposite side exposed to Pressure adjacent to the valve outlet. The apparatus includes conduit means for communicating the main valve inlet with the actuating chamber and the main valve outlet, and a positioning means for positioning the second main valve Portion with respect to the first main valve portion to control flow through the valve. The positioning means has a controller and a servo valve assembly. The controller is controllable by an operator to move between first and second positions thereof and the servo valve assembly cooPerates with the conduit means to control flow therethrough and has first and second servo valve portions. The first servo valve portion is moveable with the controller to reflect position of the controller between the first and second positions thereof. The second servo portion cooperates with the second main valve portion so that the second servo valve portion and the second main valve portion can move together with respect to the first main valve portion.

A detailed disclosure following, related to drawings, describes a preferred embodiment of the invention which is capable of expression in structure other than that particularly described and illustrated.

DETAILED DISCLOSURE

Figure 1:
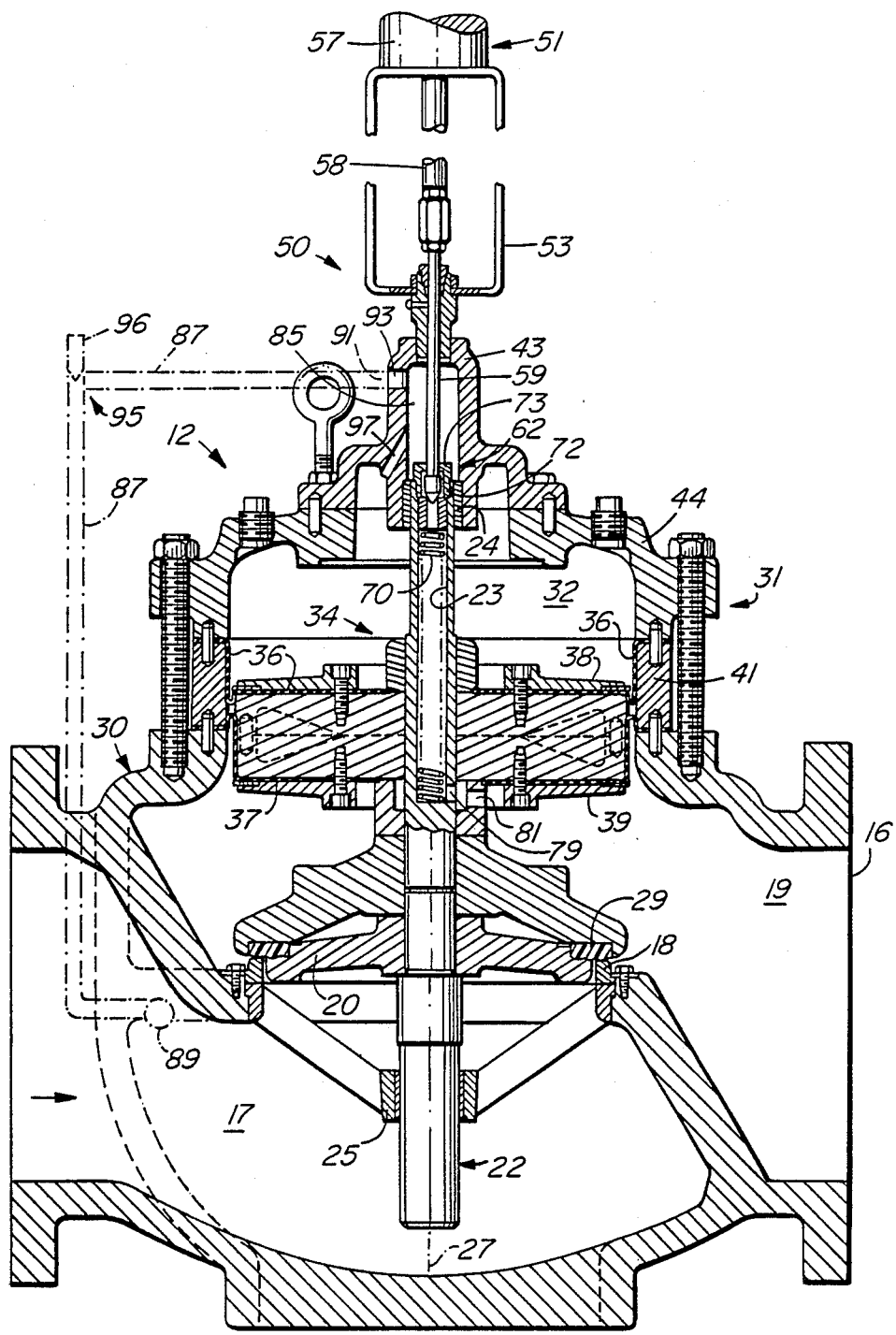
FIG. 1 is a simplified longitudinal cross-section of a valve apparatus according to the invention shown in a closed position.

Referring mainly to FIG. 1, a valve apparatus 10 according to the invention has a valve body 12 having a main valve inlet portion 14, a main valve outlet portion 16, and a main valve seat 18 disposed therebetween. The seat is an annulus and provides communication between the main valve inlet and outlet. The apparatus also includes a main valve member 20, which is sometimes known as an inner valve assembly, and is secured to a valve stem 22 which has a valve stem bore 23 adjacent an inner or upper end thereof. The stem 22 is carried within longitudinally spaced apart upper and lower stem guides 24 and 25 respectively, and is guided for movement relative to the valve seat along a main valve axis 27. The main valve member 20 has a resilient rubber-like sealing rim Portion 29 which engages the valve seat 18 so as to seal the valve, preventing flow through the inlet and outlet portions. Inlet and outlet chambers 17 and 19 communicate with the main valve inlet and outlet portions 14 and 16 respectively, and are separated by the main valve Portion 20 when closed as shown in FIG. 1. It can be seen that the seat 18 is a first main valve portion, and the valve member 20 is a second main valve portion which is complementary to the first main valve portion and is moveable between open and closed positions thereof so as to seal against the first main valve portion.

The valve body 12 includes a main conduit portion 30 containing the inlet and outlet chambers 17 and 19 and the valve seat 18, and a bonnet portion 31 containing an actuating chamber 32. The actuating chamber 32 is disposed between the upper and lower stem guides 24 and 25 and disposed concentrically of the axis 27. The valve stem 22 carries a partition retainer 34 which is a Piston-like disc secured to the stem above the main valve member 20. The partition retainer has inner and outer surfaces to which are secured inner and outer flexible diaphragms 36 and 37 respectively. Inner and outer clamp rings 38 and 39 are secured to the partition retainer and sandwich inner peripheries of the inner and outer diaphragms 36 and 37 therebetween. Outer peripheries of the diaphragms 36 and 37 are secured adjacent to side walls of the actuating chamber 32 as follows. The bonnet Portion 31 is fabricated from three main comPonents, namely an intermediate ring 41 secured to the conduit portion 30, an outer end Portion 44, and an outer cap 43. The intermediate ring 41, the Portion 44 and the cap 43 are located relative to each other by undesignated dowels within complementary aligned oPenings, and are secured together by undesignated fasteners as required. As can be seen, outer peripheries of the diaphragms 36 and 37 are secured adjacent opposite end faces of the intermediate ring 41, which permit a stroke of the partition means without stretching the diaphragms. This produces an essentially frictionless seal between the partition retainer and the actuating chamber with negligible leakage therebetween. It can be seen that the partition retainer 34 and the diaphragms 36 and 37 serve as a partition means moveable within the actuating chamber and cooperating with the second valve portion to move therewith. It can be seen that one side of the partition means, i.e. an inner side, is exposed to pressure in the actuating chamber 32, and an oPPosite side of the partition means, i.e. an outer side, is exposed to pressure adjacent the outlet portoin 16.

Figure 2:
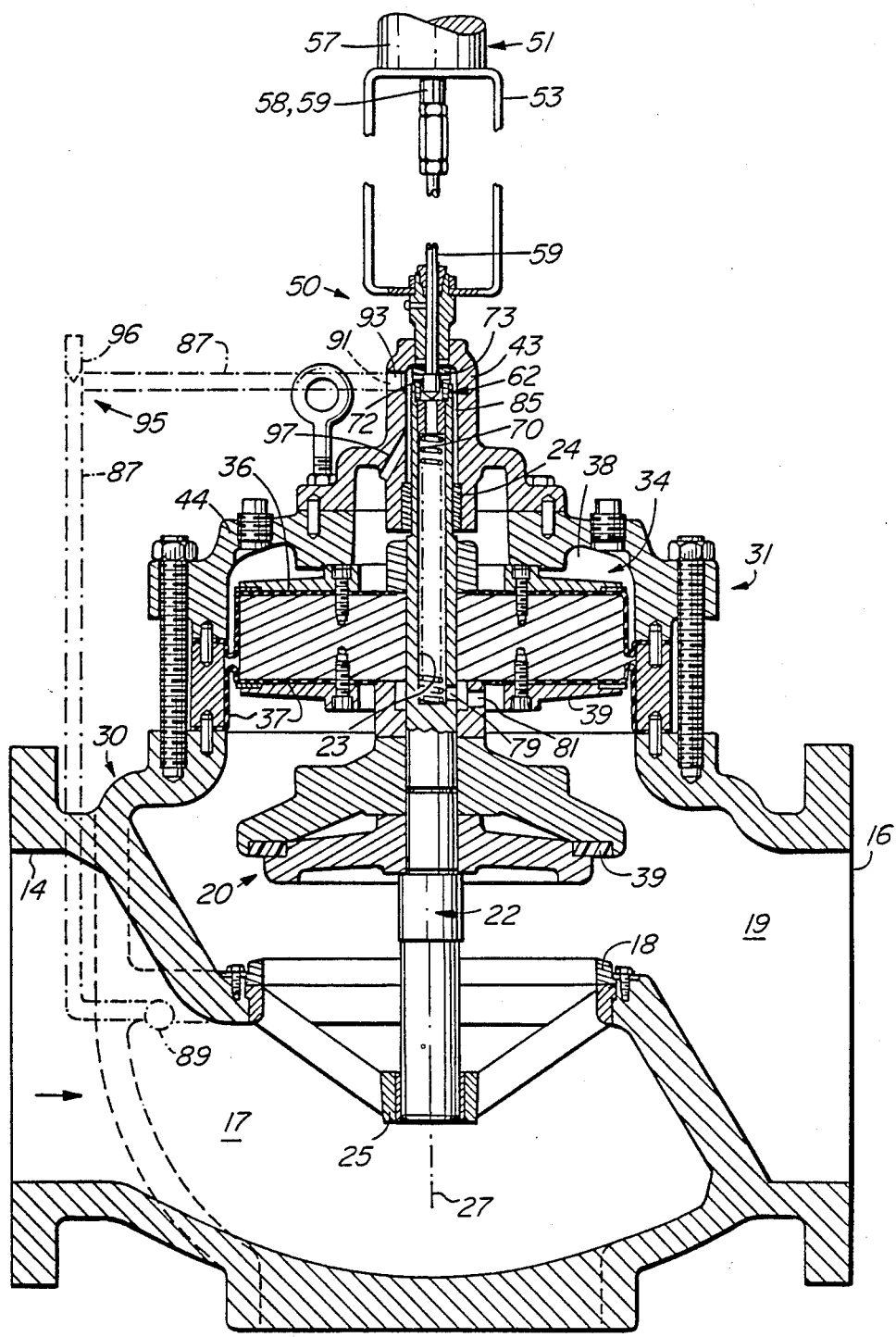
FIG. 2 is a view similar to FIG. 1 showing the valve in an open position.

As seen by comparing FIGS. 1 and 2, reciprocal movement of the main valve member 20 between open and closed partitions thereof is a result of a corésponding reciprocal movement of the partition retainer 34. The partition retainer 34 is sealed within the actuating chamber and corresponding rolling of the flexible diaphragms 36 and 37 along an inside face of the actuating chamber 32 varies volume of the actuating chamber 32.

The apparatus includes positioning means 50 having a controller 51 secured adjacent an upper portion of the outer cap 43 by a mounting frame 53. The controller is a linear actuator, such as a solenoid, which has a solenoid body 57 and a solenoid output shaft 58 extending therefrom and connected to valve control shaft 59. To ensure accurate location of the shaft 59 in response to movement of the output shaft 58, a known feedback loop with associated circuitry (not shown) is provided so that the control shaft 59 can be located at any position between fully extended and fully retracted positions. Alternative controllers can be substituted, e.g. other types of linear actuators which can be electrical, mechanical or pneumatic etc. and which generate a relatively low force and can be positioned with respect to a datum.

Figure 3:
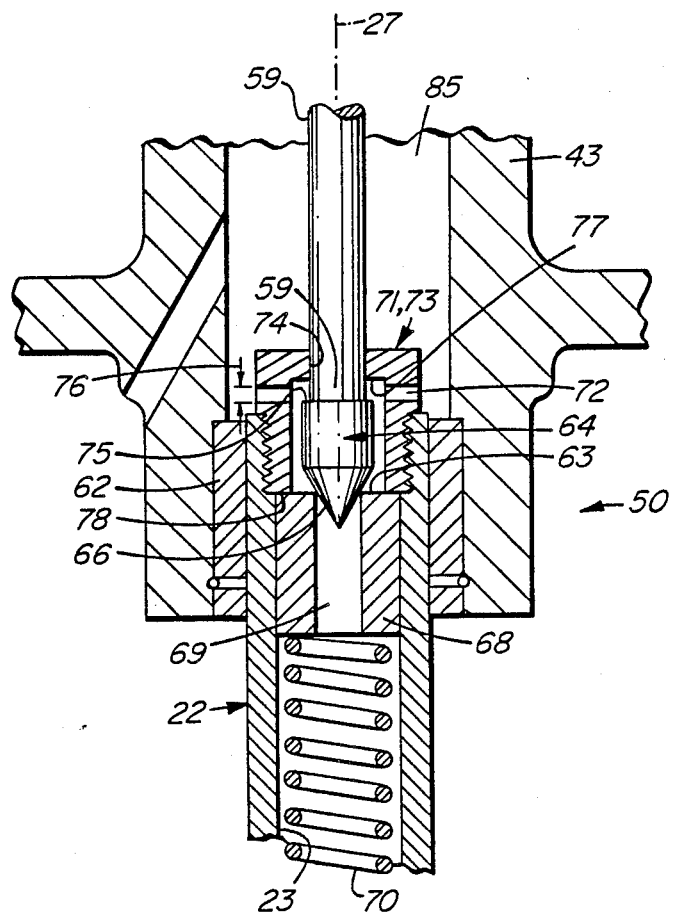
FIG. 3 is a simplified fragmented longitudinal cross-section of a servo valve means and related structure, as shown in FIG. 1, but at enlarged scale.

As best seen in FIG. 3, the positioning means 50 and associated structure function similarly to a servomechanism which uses a servo valve assembly 62 to position the main valve member 20 where required. This general type of structure can also be referred to as an integral or internal Pilot valve assembly, but in the present disclosure and claims the valve assembly and associated valve components are referred to as a servo valve, servo valve portions, etc. The servo valve assembly 62 has a servo valve seat 63 mounted adjacent an outer end of the valve stem 22, and a servo valve member 64 mounted at an end of the control shaft 59. The servo valve member has a head having a conical face 66 which is complementary to the valve seat 63 to provide a sealed valve assembly when the valve member engages the seat. The seat 63 is an outer end of a valve annulus 68 which has a central bore 69 extending along the axis 27 into the bore 23 of the valve stem. The annulus 68 has an outer periphery which is sealed with, and is a sliding fit against, the side wall of the bore 23. A servo valve spring 70 extends between the valve annulus, that is the servo valve seat, and the valve stem to resiliently mount the servo valve seat for reasons to be described.

The upper end of the main valve stem has a servo valve cage 73 releasably secured thereto, e.g. by screw-threads, and has a perforated side wall 72 and an outer end portion 71 which has a shaft opening 74 to receive the end of the control shaft 59 passing therethrough. The cage 73 has an inner end portion 78 which projects inwardly of the bore 23 to provide an annular shoulder to interfere with the valve annulus 68 carrying the valve seat, and thus serves as a valve seat stop to locate the annulus which is held thereagainst by the valve spring 70. The head of the valve member 64 has a maximum diameter which is greater than the diameter of the shaft opening 74, and thus interferes therewith to prevent withdrawal of the valve member upwardly through the opening 74 of the cage. Clearly, the servo valve cage serves as a servo valve retaining means for limiting movement of the servo valve assembly with respect to the valve stem, and thus with respect to the main valve member 20. When the valve member 64 is seated on the seat 63 as shown, a shoulder 75 of the valve head is spaced from an oppositely facing outer shoulder 77 of the valve cage 73 by a spacing 76 which defines maximum movement between the valve member 64 and the valve seat 63. In effect, the servo valve retaining means has an inner stop means, namely the servo valve seat 63, and an outer stop means, namely the outer shoulder 77, which define the clearance space 76 therebetween. The servo valve member 64 is moveable between the inner and outer stop means, and cooperates therewith so as to interfere with one of the stop means as required.

Referring again to FIGS. 1 and 2, the bore 23 of the valve stem has an inner discharge opening 79 which communicates through a clearance opening 81 of the valve member 20 to pass fluid into the outlet chamber 19. The outer cap 43 has a side wall defining in part a receiving cavity 85 within the cap 43, which cavity communicates with the central bore 69 (FIG. 3) of the valve seat through the perforated side wall 72 of the cage 73 when the valve assembly 72 is open. The side wall of the cap 43 has a conduit port 93 and a transfer conduit 97. A conduit means 87 is shown diagrammatically, mostly in broken outline, and has an inlet 89 communicating with the inlet chamber 17, and an outlet 91 which communicates with the conduit port 93 in the outer cap 43 so as to communicate with the cavity 85. A variable orifice means 95 having a flow restricting screw 96 is provided in the conduit means 87 so as to vary restriction of flow through the conduit means for purposes to be described. Thus, there is communication from the inlet chamber 17 through the conduit means 87, the variable orifice means 95 and into the cavity 85 of the outer cap 43. The transfer passage 97 extends between the cavity 85 and the actuating chamber 23 so that fluid from the inlet chamber 17 can pass through the receiving cavity 85 and into the actuating chamber 32, having been metered to a lowered pressure by the variable orifice means 95. Fluid can also pass from the receiving cavity 85, through the positioning valve assembly 62, when open, and through the stem bore 23 and the openings 79 and 81 into the outlet chamber 81.

It can be seen that the stem bore 23 also forms a portion of the conduit means 87 and has first and second end portions. The first end portion of the stem bore communicates with the servo valve seat, and the second end portion of the stem bore communicates with the main valve outlet.

Operation

Referring to FIG. 1, the main valve member 20 is shown held against the main valve seat 18, in which position the apparatus 10 is closed and the output shaft 58 is fully extended so that the servo valve member 64 is held against the servo valve seat 63. The inlet chamber 17 is subjected to relatively high fluid pressure which pressure is transmitted through fluid in the conduit means 87, through the variable orifice means 95 into the receiving cavity 85, through the transfer conduit 97 into the actuating chamber. Because the servo valve assembly 62 is closed, fluid cannot escape from the receiving cavity or the actuating chamber 32 and thus there is no flow from the chamber, or along the conduit means 87. Consequently, there is no pressure loss at the variable orifice means 85, and the pressure in the actuating chamber 32 is essentially equal to pressure in the inlet chamber 17. Because cross-sectional area of the partition retainer 34 is greater than the cross-sectional area of the main valve member 20 exposed to inlet pressure, the downwards force against the valve seat 18 exceeds the upwards force against the valve member 20 and thus the main valve remains closed.

Referring to FIG. 2, the servo valve assembly is shown opened, with the servo valve member 64 at a maximum spacing from the valve seat 63. This position illustrates an upper limit of the valve member 20, wherein weight of the main valve member etc. is supported by the controller or solenoid 51. To attain the raised position as shown, from the position as shown in FIG. 1, the sequence of operations is as follows. The shafts 58 and 59 withdraw the valve member 64 off the servo valve seat 63, thus opening the valve assembly 62. This causes fluid from the cavity 85 to flow through the perforated sidewall of the valve cage 73, through the bore 69 of the valve seat 63, along the valve stem bore 23 and out through the openings 79 and 81 and into the outlet chamber 19. Fluid flowing from the cavity 85 reduces pressure in the cavity 85 which causes a corresponding flow of fluid in the conduit 87, together with some displacement of fluid from the actuating chamber 32, due to the reversal of the pressure differntial across the diaphragms 36 adn 37 adn the partition retainer 34. Fluid flowing from the conduit 87 is metered through the orifice means, which reduces pressure further in the receiving chamber 85. There is thus a further decrease in pressure in the actuating chamber 32 and downward force on the partition means 34 is reduced sufficiently to permit the upwards force from the fluid in the inlet chamber 17 acting on the main valve member 20 to move the main valve member off the seat 18. Thus, the main valve opens and flow fluid commences through the valve seat 18 from the inlet portion 14 to the outlet portion 16.

The main valve 20, the stem 22 and the partition retainer 34 continue to rise until the servo valve seat 63 contacts the servo valve member 64 in a new position which can be intermediate of the closed and open positions as shown in FIGS. 1 and 2. Speed of upwards movement of the main valve member is usually less than speed of upwards movement of the servo valve member 64. When the seat contacts the member 64, flow through the valve seat 63 stops, and flow through the stem bore 23 stops, and thus flow through the conduit means 87 also stops. This flow stoppage enables pressure in the actuating chamber 32 to equalize with pressure in the inlet chamber 17, thus preventing further movement of the valve member. Any residual upwards movement of the valve stem that might continue momentarily after seating of the servo valve member 64 on the servo valve seat 63 is absorbed by deflection of the valve spring 70, thus eliminating damage to the servo valve assembly or controller 51.

It can be seen that the valve stem, main valve member 20 and partition means will stop essentially at any position within the stroke of the actuator output shaft 58 between its fully lowered position as shown in FIG. 1, to the fully raised position as shown in FIG. 2. Thus, the servo valve assembly acts essentially as a master unit, and the main valve and partition retainer follow it as a slave unit.

The main valve will rise upwardly as long as the servo valve assembly is open. Usually, the actuator shaft will "lead" the valve stem and will apply a relatively low upwards force on the end portion 71 of the valve cage. As previously stated, while this force may be insufficient to pull the valve member 20 upwards against fluid forces, it can be sufficient to support a portion or all of the weight of the valve member 20 when the main valve is fully opened. This reduces "effective" weight of the main valve member 20, which reduces flow restriction through the valve seat 18 when the main valve member 20 "rides the flow" when the apparatus 10 is open.

It can be seen that the positioning means 50, i.e. the controller 51 and servo valve assembly 62, position the main valve member 20 with respect to the main valve seat 18 to control flow through the main valve. The controller is controllable by an operator to move between first and second positions thereof and the servo valve assembly cooperates with the conduit means to control flow therethrough. The servo valve member 64, serving as a first servo valve portion, is moveable with the controller to reflect position of the controller between the first and second positions thereof. The servo valve seat 63, serving as a second servo valve portion, cooperates with the second main valve portion so that the second servo valve portion and the main valve portion can move together with respect to the first main valve portion.

As indicated earlier, the orifice means 95 is variable, and by a simple adjustment of the flow restricting screw 96, pressure loss through the conduit means 87 can be selected to determine speed of response of the valve apparatus, which is dependent on operating parameters. Clearly, the greater the restriction of flow through the orifice means 95, the greater the pressure drop in the receiving cavity 85, and a corresponding faster response of the valve member to open or close, other conditions being equal.

The reverse procedure closes the main valve as follows. From a position shown in FIG. 2, the solenoid output shaft 58 is extended downwardly until the servo valve member 64 contacts the servo valve seat 63, thus closing the servo valve assembly to flow therethrough. This contact may result in slight inwards movement of the valve annulus 68 away from the portion 78 (FIG. 3) which produces a marginal increase in compression of the spring assembly, but this movement is immaterial and reduces wear and possible damage to the seat 63 or member 64. When flow through the servo valve assembly stops, the flow through the conduit means 87 also stops, which raises the pressure in the actuating chamber 32 to essentially equal pressure in the inlet chamber 17. It is noted that normal flow of liquid through the main valve seat 18 and past the member 20, even when fully open, reduces pressure in the outlet chamber 19 with respect to the inlet chamber 17 due to the metering effect of turbulence and other flow losses adjacent the main valve. Thus, fluid pressure forces in the outlet chamber 19 acting on the lower face of the diaphragm 37 and partition retainer 34, i.e. the partition means, are exceeded by forces acting downwardly on the upper face of the partition means due to fluid pressure within the actuating chamber 32. Consequently, the partition means, and with it the valve stem and main valve member 20, commence downwards movement tending to close the main valve. The downwards movement of the valve member will continue at the same speed as the rate of extension of the solenoid output shaft 58, probably with some slight variations due to compression of the spring 70.

When the output shaft 58 stops extending, usually the valve member 20 will continue moving a short distance, at least until the valve annulus 68 contacts the stop at the upper end of the stem, and the servo valve member 64 unseats from the valve seat 63. Any residual increase in compression of the spring 70 is thus removed when the annulus 68 again contacts the portion 78 (FIG. 3). This permits fluid to flow through the servo valve assembly and out through the bore of the valve stem, which produces a decrease in pressure in the actuating chamber 32, which eventually reduces downwards force on the diaphragm until it is balanced by upwards force due to the outlet pressure. Thus, the main valve member 20 will stop in any position as determined by the servo valve member 64. Again, it can be seen that the servo valve member 64 acts as a master, with the main valve member 20 acting as a slave to follow movement thereof.

Alternatives

The invention is disclosed for use with a basically conventional poppet type valve having a fixed annular valve seat 18, or female first valve portion, and a moveable poppet valve member 20, or male second valve portion. The poppet valve member moves axially between open and closed positions, and thus the actuating chamber is disposed axially thereof. Alternative structures envisage use of a sliding spool or sleeve valve, or a rotary valve, all of which can utilize pressure differential across the main valve member, with a servo valve assembly acting as a master for positioning the valve member therebetween.

The partition means is shown to be a double rolling diaphragm type piston, but an alternative partition means could be a piston with slideable cup seals around the periphery thereof. However, a piston with cup seals is more prone to leakage past, or to sticking to, the chamber sidewalls, causing erratic functioning and possible maintenance problems. Other types of partition means can be substituted, and are equivalent if one side thereof is exposed to pressure in the actuating chamber, and the opposite side is exposed to pressure adjacent the valve outlet.

We claim:
1. A valve apparatus having:
(a) a valve body having a main valve inlet, a main valve outlet and a first main valve portion disposed therebetween,
(b) a second main valve portion which is complementary to the first main valve portion and is moveable between open and closed positions thereof so as to seal against the first valve portion,
(c) a main valve actuating means for moving the second main valve portion between the open and closed positions thereof, the actuating means having an actuating chamber and a partition means moveable within the actuating chamber, the partition means having one side exposed to pressure in the actuating chamber, and an opposite side exposed to pressure adjacent the valve outlet, the partition means cooperating with the second valve portion to move therewith,
(d) conduit means for communicating the main valve inlet with the actuating chamber and the main valve outlet, the conduit means having an orifice disposed between the main valve inlet and the actuating chamber to reduce pressure of fluid flow in the conduit from the main valve inlet,
(e) a positioning means for positioning the second main valve portion with respect to the first main valve portion to control flow through the valve, the positioning means having a controller and a servo valve assembly, the controller being controllable by an operator to move between first and second positions of the controller, and the servo valve assembly cooperating with the conduit means to control flow therethrough and having first and second servo valve portions, the first servo valve portion being moveable with the controller between the first and second positions thereof, the second servo valve portion cooperating with the second main valve portion so that the second servo valve portion and the main valve portion can move together with respect to the first main valve portion, the second servo valve portion being resiliently mounted with respect to the second main valve portion so as to vary spacing therebetween when the second servo valve portion is subjected to a force.

2. A valve assembly as claimed in claim 1, in which:
(a) the first main valve portion is a main valve seat providing communication between the main valve inlet and the main valve outlet,
(b) the second main valve portion is a main valve member complementary to the main valve seat for sealing thereagainst.

3. A valve apparatus as claimed in claim 1, in which:
(a) the first main valve portion is a main valve seat providing communication between the main valve inlet and the main valve outlet,
(b) the second main valve portion is a main valve member complementary to the valve seat for sealing thereagainst,
(c) the first servo valve portion is a servo valve member,
(d) the second servo valve portion is a servo valve seat which is complementary to the servo valve portion,
(e) the second main valve member has a valve stem which is guided for movement relative to the valve seat,
(f) a servo valve spring extends between the servo valve seat and the valve stem to resiliently mount the servo valve seat.

4. A valve apparatus as claimed in claim 3, in which:
(a) the valve stem has a stem bore to accept the servo valve spring therein and to form a portion of the conduit means, the stem bore having first and second end portions,
(b) the first end portion of the stem bore communicates with the servo valve seat and the second end portion of the stem bore communicates with the main valve outlet.

5. A valve apparatus as claimed in claim 3, in which:
(a) the main valve stem has a servo valve retaining means for limiting movement of the servo valve assembly with respect to the second main valve member.

6. A valve apparatus as claimed in claim 5, in which:
(a) the servo valve retaining means has inner and outer stop means defining a clearance space therebetween, one of the stop means being the second servo valve portion,
(b) the first servo valve portion is moveable between the inner and outer stop means, and cooperates therewith so as to interfere with one of the stop means as required.

7. A valve apparatus as claimed in claim 6, in which:
(a) the inner stop means is the servo valve seat of the servo valve assembly,
(b) the servo valve means in mounted on the controller and interferes with the outer stop means.

8. A valve aPparatus as claimed in claim 1, in which:
(a) the actuating chamber has a side wall,
(b) the partition means is a rolling diaphragm having an inner portion mounted for movement with the second main valve means, and an outer portion secured to the side wall of the actuating chamber.

9. A valve apparatus as claimed in claim 1, in which:
(a) the orifice is variable to vary restriction of flow in the conduit so as to vary pressure drop therealong and resulting pressure in the actuating chamber.

10. An apparatus as claimed in claim 1, in which:
(a) the controller is a linear actuator having an extensible and retractable output shaft, the shaft having an outer end mounting the first servo valve portion.

11. An apparatus as claimed in claim 10, in which:
(a) the linear actuator is a solenoid for determining accurate location of the outer end of the output shaft thereof.

* * * * *